United States Patent
Rivkin et al.

(10) Patent No.: US 9,934,795 B1
(45) Date of Patent: Apr. 3, 2018

(54) RECORDING HEAD WITH FIRST AND SECOND COILS THAT INDUCE FLUX INTO WRITE POLE AND SHIELD

(71) Applicant: Seagate Technology LLC, Cupertino, CA (US)

(72) Inventors: Kirill Aleksandrovich Rivkin, Edina, MN (US); Mourad Benakli, Eden Prairie, MN (US); Hua Zhou, Plymouth, MN (US); Huaqing Yin, Eden Prairie, MN (US); Tae-Woo Lee, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/618,315

(22) Filed: Jun. 9, 2017

(51) Int. Cl.
*G11B 5/17* (2006.01)
*G11B 5/31* (2006.01)
*G11B 5/127* (2006.01)
*G11B 5/00* (2006.01)

(52) U.S. Cl.
CPC .......... *G11B 5/3146* (2013.01); *G11B 5/1278* (2013.01); *G11B 5/17* (2013.01); *G11B 5/314* (2013.01); *G11B 5/315* (2013.01); *G11B 2005/0021* (2013.01)

(58) Field of Classification Search
CPC ....... G11B 5/314; G11B 5/315; G11B 5/1278; G11B 5/17
USPC ........................................ 360/123.11, 125.31
See application file for complete search history.

(56) References Cited

U.S. PATENT DOCUMENTS

| 8,630,153 | B1* | 1/2014 | Wang ................... G11B 5/1278 |
| | | | 369/13.13 |
| 8,804,280 | B2 | 8/2014 | Lopusnik et al. |
| 9,099,108 | B2 | 8/2015 | Meloche et al. |
| 9,153,254 | B1* | 10/2015 | Rivkin ....................... G11B 5/17 |
| 9,202,479 | B1* | 12/2015 | Wessel ....................... G11B 5/31 |
| 9,218,827 | B1* | 12/2015 | Sasaki ....................... G11B 5/17 |
| 9,286,918 | B1 | 3/2016 | Xue et al. |
| 9,343,098 | B1* | 5/2016 | He ....................... G11B 5/00826 |
| 9,368,133 | B2* | 6/2016 | Rivkin ....................... G11B 5/17 |
| 9,489,968 | B2* | 11/2016 | Saito ..................... G11B 5/3123 |
| 2007/0096854 | A1* | 5/2007 | Matsumoto .............. G11B 5/02 |
| | | | 335/208 |
| 2011/0122737 | A1 | 5/2011 | Shimazawa et al. |
| 2012/0170429 | A1* | 7/2012 | Zhou .................... G11B 5/1278 |
| | | | 369/13.33 |
| 2013/0242432 | A1* | 9/2013 | Meloche .................. G11B 5/17 |
| | | | 360/123.05 |
| 2016/0225390 | A1* | 8/2016 | Saito ..................... G11B 5/3123 |

* cited by examiner

*Primary Examiner* — Jefferson Evans
(74) *Attorney, Agent, or Firm* — Hollingsworth Davis, LLC

(57) ABSTRACT

A recording head has a near-field transducer at a media-facing surface of the recording head and a write pole on a first side of the near field transducer. A first coil induces a first flux in the write pole. The recording head includes a shield on a second side of the near-field transducer that faces away from the first side. A second coil is proximate the shield and induces a second flux in the shield that controls a field angle of the first flux.

20 Claims, 5 Drawing Sheets

US 9,934,795 B1

RECORDING HEAD WITH FIRST AND SECOND COILS THAT INDUCE FLUX INTO WRITE POLE AND SHIELD

SUMMARY

The present disclosure is directed to a recording head with first and second coils that induce flux into a write pole and a shield. In one embodiment, a recording head includes a near-field transducer at a media-facing surface of the recording head and a write pole on a first side of the near field transducer. A first coil induces a first flux in the write pole. The recording head includes a shield on a second side of the near-field transducer that faces away from the first side. A second coil is proximate the shield and induces a second flux in the shield that controls a field angle of the first flux.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. Drawings are not necessarily to scale.

DETAILED DESCRIPTION

The present disclosure generally relates to data storage devices that utilize magnetic storage media, e.g., disks. Data storage devices described herein use a particular type of magnetic data storage known heat-assisted magnetic recording (HAMR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

Figure 1:
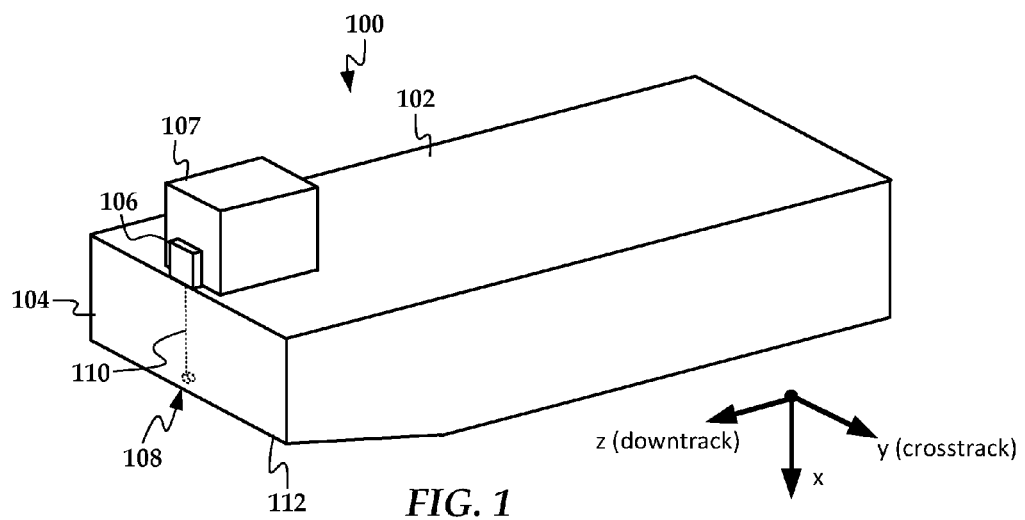
FIG. 1 is a perspective view of a slider assembly according to an example embodiment.

A HAMR device uses a near-field transducer to concentrate optical energy into a hotspot in a recording layer. The hotspot raises the media temperature locally, reducing the writing magnetic field required for high-density recording. A waveguide integrated into a read/write head delivers light to the near-field transducer and excites the near-field transducer. In response, the near-field transducer achieves surface plasmon resonance and tunnels a stream of surface plasmons to heat the recording medium. A magnetic transducer, which includes a magnetic write pole, applies a magnetic field to the hotspot, locally changing magnetic orientation within the hotspot, while regions outside the hotspot are not affected by the applied field. In the following disclosure below, a magnetic transducer is described that can improve saturation, rise time, and field angle in HAMR recording system In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode 106 mounted on submount 107) and a waveguide 110. The waveguide 110 delivers electromagnetic energy from the energy source 106 to a near-field transducer that is part of the read/write transducers 108. The near-field transducer achieves surface plasmon resonance in response and directs the energy out of a media-facing surface 112 to create a small hot spot on the recording medium.

Figure 2:
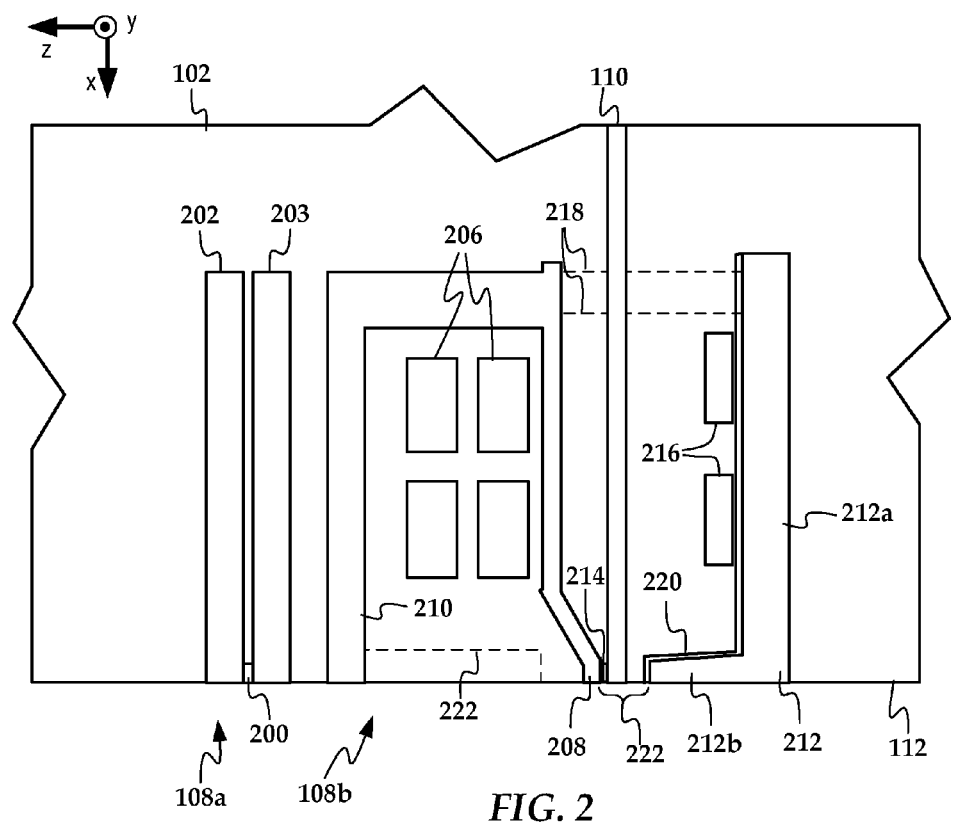
FIGS. 2, 3, and 4 are cross-sectional views of magnetic write configurations according to example embodiments.

In FIG. 2, a cross-sectional view of a slider shows details of the read/write transducers 108 according to an example embodiment. A read transducer 108a includes a read element 200 (e.g., magnetoresistive stack) located between shields 202-203. A write transducer includes a coil 206 that, when energized, induces magnetic flux through a write pole 206 and a return pole 210. A near-field transducer (NFT) 214 is located at the media-facing surface 112 proximate the write pole 206. Light propagating through the waveguide causes the NFT 206 to achieve surface plasmon resonance.

In the illustrated HAMR system, the NFT is located on one side of the optical/waveguide system 110, which introduces asymmetry into the magnetic system. A significant portion of the magnetic system (e.g., write pole 208) is located on one side of the waveguide 110 and other optical components, resulting in a number of issues. For example, it is preferable to have faster saturation at the recording point, which is at the tip of the write pole 208 facing the NFT 214. Features of the write pole 208 at this location also control write field angle at the same location. In this example an L-shaped leading shield 212 is shown on a downtrack side of the NFT 214 opposite the write pole 208. By itself, the leading shield 212 will improve rise time, but force the write pole 208 to saturate first (at lower currents) on the trailing side (e.g., towards return pole 210), and will not increase the field angle at the leading edge that faces the NFT 214.

Using the leading shield 212 can introduce difficulty of building an efficient flux closure path at the leading edge of the write transducer 108b (the right side in this figure). For example, a conventional closed writer core can be coupled to the return pole 210 and coil 206 (e.g., using a via as indicated by broken lines 218), however this via 218 could obstruct or interfere with the optical path 110. Building the via and leading shield 212 at a substantial distance from the NFT 214 and waveguide 110 will result in reduced static and dynamic efficiency. Putting a shield on the trailing edge of the write pole 208 (e.g., as indicated by dashed lines 224) could draw away flux from the leading edge of write pole 208, resulting in slow rise time and saturation.

One design that has been shown to provide consistently high effective field is a leading shield 212 with a dedicated, second coil 216. The leading shield 212 may optionally be magnetically coupled to the trailing shield 210, e.g., by way of a via 218 or other flux path between shields 210, 212, or the shields 210, 212 may not be coupled by a flux path, e.g., isolated from one another. The second coil 216 is activated by a current that is coordinated in timing, polarity, amplitude, overshoot, etc., with a current applied to the first coil 206. The flux generated by the two coils 206, 216 in response to these separate currents can be tuned to achieve a desired field angle and other magnetic field characteristics during recording.

Baseline signals applied to the coils 206, 216 can be selected based on fixed geometry such as the size of the gap 222 between the leading shield 212 and the write pole 208 (e.g., around 90-130 nm in some configurations), the geometry of the coils 206, 216 and shields 210, 212, etc. Because the magnetic characteristics can be actively controlled by coordination of the current sent to the coils 206, 216, the magnetic flux characteristics can be actively varied during recording to account for various operating conditions, e.g., ambient temperature, skew angle, bit aspect ratio, etc. For example, write angle can be optimized by adjusting current balance between coils to the left and the right side of the writer. Such balancing may correlate to the operating temperature.

Figure 3:
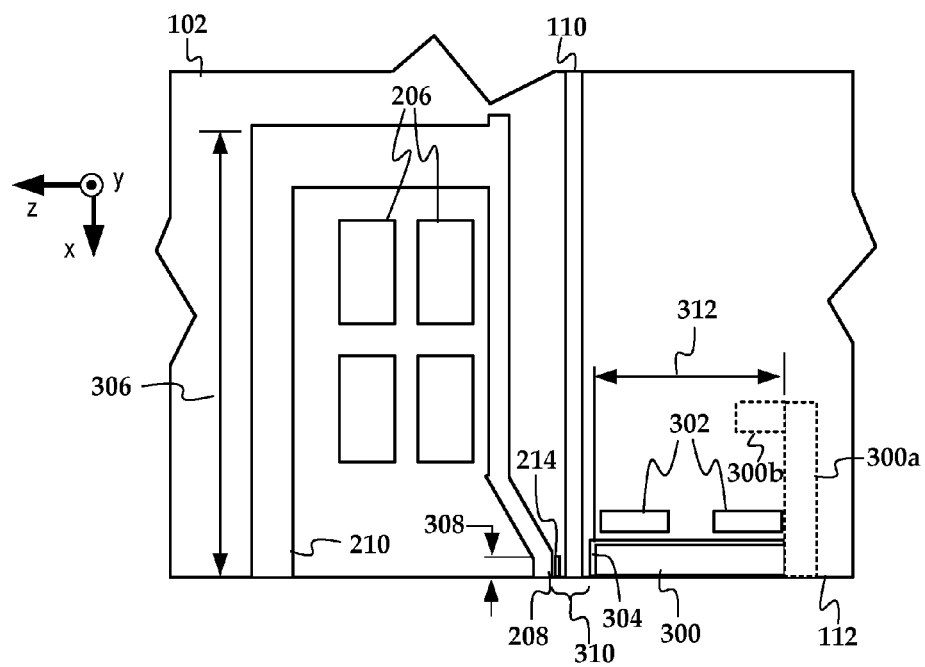

The second coil 216 may include one or more turns and can be deposited on various parts of the leading shield 212. In FIG. 2, the second coil 216 is relatively far from the NFT 214 although in close proximity to one portion 212a of the shield 212. The leg 212a is deposited on a substrate-parallel plane, the xy-plane in this example. Due to the separation between the coil 216 and the NFT 214, the leading shield 212 is relatively thick and tapers as the other portion 212b approaches the NFT 214. The portion 212b is parallel to the media-facing surface. In other arrangements, a leading coil may be placed in closer proximity to the NFT 214. In FIG. 3, a cross-sectional diagram shows a leading shield configuration according to another embodiment. For purposes of convenience, the same reference numbers are used in FIG. 3 (and subsequent figures) for same/similar components shown in FIGS. 1 and 2, and the embodiments shown in FIG. 3 and subsequent figures may use components shown in FIGS. 1 and 2 but not reproduced in FIG. 3 or subsequent figures.

As seen in FIG. 3, a second, leading shield 300 is a plate-like structure substantially parallel to the media-facing surface. A second, leading coil 302 is in close proximity to both the leading shield 300 and NFT 214. At least part of the coil 302 extends to an edge of the leading shield 300 that faces the NFT 214. The second coil 302 is also parallel to the media-facing surface 112. As indicated by portion 300a drawn in dashed lines, the shield 300 may alternatively have an L-shape, which can maximize the interaction with the coils. The shield can also be partially wrapped around the coils 302, as indicated by portion 300b.

Due to the close proximity of the second coil 302 to the second shield 300, a relatively thin shield (e.g., around 100 nm thick) could be used. Placing the second coil 302 and second shield 300 this close the optical components could impact optical efficiency. One way to preserve the optical performance of the system is by depositing a reflective layer 304 (e.g., gold layer) on one or more surface of the second shield 300. The layer 304 may extend over additional surfaces of the shield 300 or cover less of the shield 300 than illustrated. The second coil 302 can also be configured to act as reflective shield. Any reflective material may be used for the layer 304, e.g., gold, silver, platinum, etc. A similar coating may be applied to the second coil 300. A reflective coating may be used in other embodiments described herein, e.g., FIG. 2 shows gold coating 220. In this configuration, return pole height 306 is around 3.5 μm, write pole height 308 is about 1 μm, gap 310 is about 80-170 nm, and second shield downtrack length 312 is about 1 μm.

Figure 4:
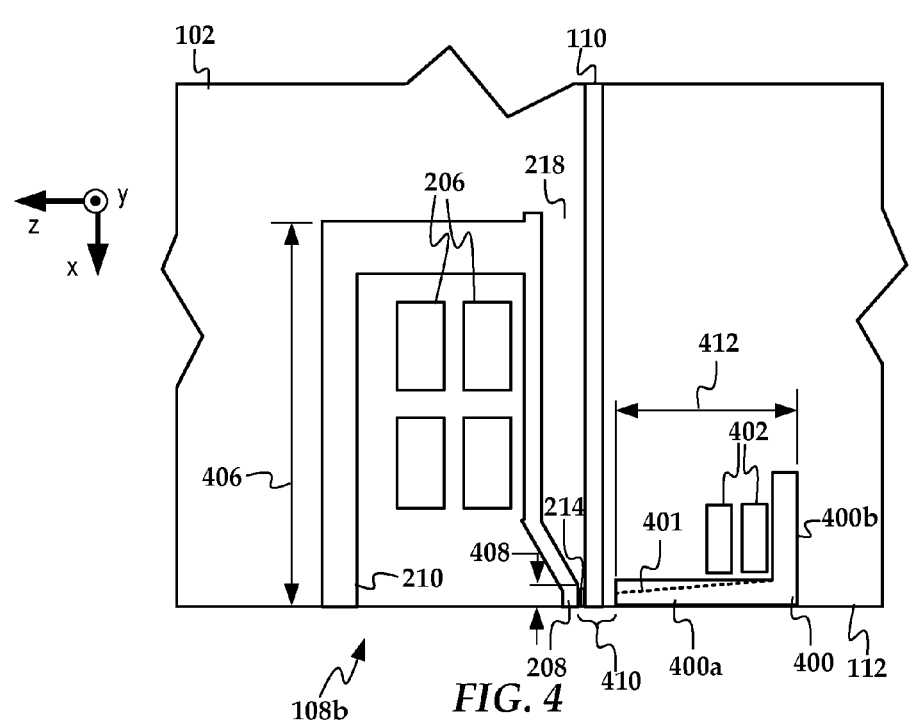

In FIG. 4, a cross-sectional diagram shows a leading shield configuration according to another embodiment. A second, leading shield 400 is an L-shaped structure. Portion 400a of shield 400 is parallel to the media-facing surface 112 and may be rectangular as illustrated, or tapered as indicated by dashed line 401. Second portion 400b of the shield 400 is normal to the media-facing surface 112, e.g., on a substrate-parallel plane. A second, leading coil 402 is in close proximity to the media-facing surface 112 and the leading shield 400, although further separated from the NFT 214 than the arrangement in FIG. 3. Generally, this coil 402 is located at the junction of the first and second portions 400a, 400b. The second coil 402 is deposited on a substrate parallel plane. In this configuration, return pole height 406 is around 3.5 μm, write pole height 408 is about 1 μm, gap 410 is about 80-170 nm, and second shield downtrack length 412 is about 1 μm.

Figure 5:
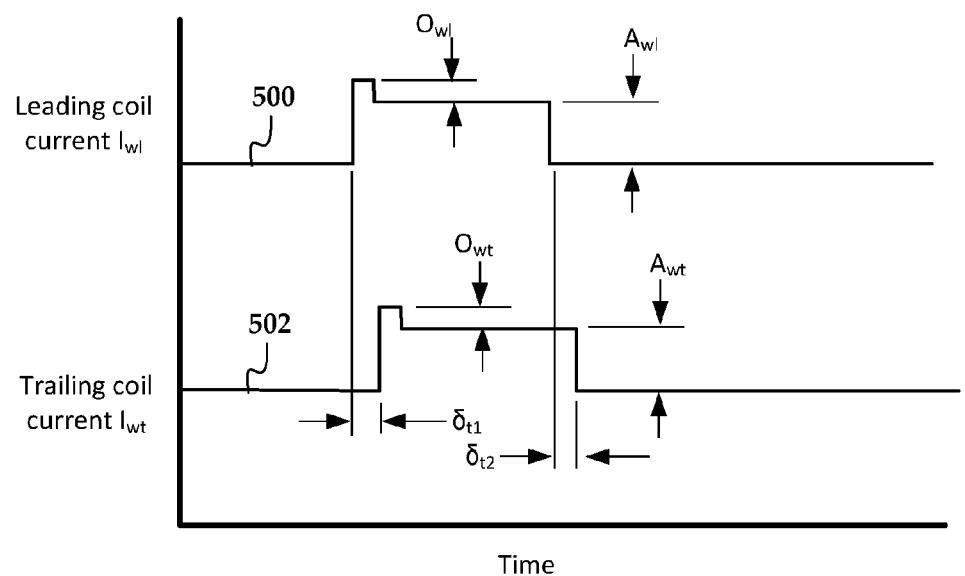
FIG. 5 is a graph showing waveforms applied to first and second coils according to an example embodiment.

In FIG. 5, a cross-sectional diagram shows a leading shield configuration according to another embodiment. A second, leading shield 500 is an L-shaped structure, with a tapered leg 500b. A second, leading coil 402 is in close proximity to the media-facing surface 112 and the leading shield 400, although further separated from the NFT 214 than the arrangement in FIG. 3. The second coil 402 is deposited on a substrate parallel plane. In this configuration, return pole height 406 is around 3.5 μm, write pole height 408 is about 1 μm, and gap 410 is about 80-170 nm.

Generally, the embodiments described above can improve risetime due to aggressive positioning of coils over the leading shield. The leading shield itself also improves risetime. The dual coils can be used to control write angle by balancing current applied to the different coils. For example, write angle can be dynamically adjusting by changing time dependence of write current.

It will be understood that the embodiments described above may use different configurations of first and second coils (e.g., number, size, spacing and orientation of coils). Other writer geometries, such as return pole height, write pole height, write-pole-to-leading-shield gap, and leading shield downtrack length, may be varied with changes to coil configurations. As noted above, separate currents are applied to the leading and trailing coils, and these waveforms can be different. An example of waveforms applied to two recording coils is shown in the graph of FIG. 5. This example shows electrical current, although may be analogous to waveforms of voltage or power applied to the coils.

As seen in FIG. 5, waveform 500 ($I_{wl}$) is applied to a leading coil and waveform 502 ($I_{wt}$) is applied to trailing coil. The waveforms may differ based on, among other things, steady state amplitude ($A_{wl}$, $A_{wt}$), overshoot ($O_{wl}$, $O_{wt}$), and time difference between start and end of activation ($\delta t_1$, $\delta t_2$). It should be noted that the time differences could be negative from what is shown, e.g., $I_{wt}$ may lead $I_{wl}$ such that $\delta t_1$ is negative. In such a case, initially energizing the write pole via the trailing edge coil can create a weaker effective field that is applied mostly perpendicular to the air bearing surface. This may correspond to recording a transition at high temperature, thereby providing high effective gradient. Then, after the delay, the second coil is powered to energize the leading edge structure, thereby enforcing large increase of effective field and write field angle, recording at lower laser power, but higher field. This would enable writing transition at high temperature and lower field to maximize the effective gradient, while writing the rest of the bit at low temperature and high field to minimize the media noise due to poorly written (at high temperature) pattern.

Figure 6:
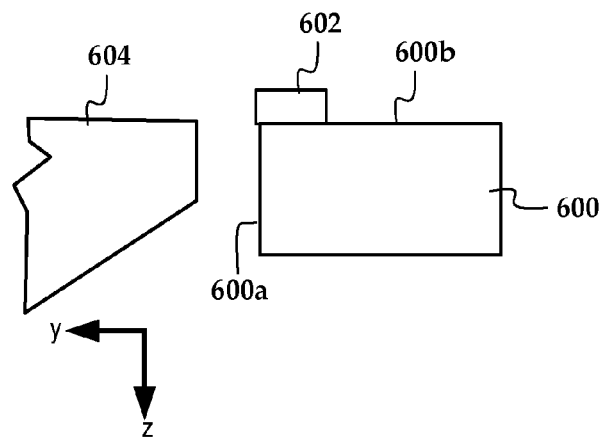
FIGS. 6 and 7 are plan views of side shield arrangements according to example embodiments.
Figure 7:
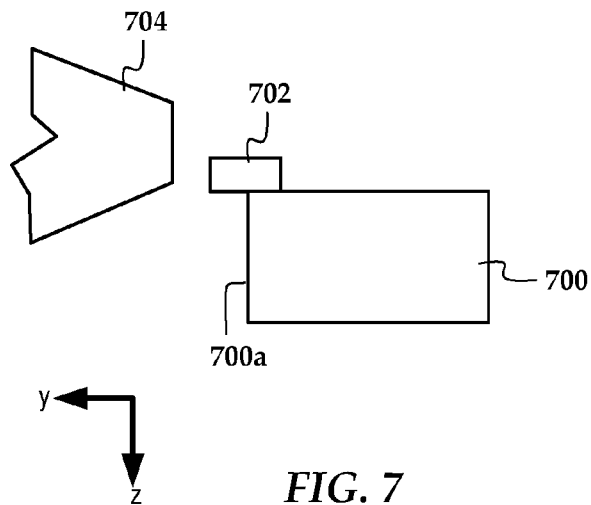

A read/write head according to example embodiments may use other features instead of or in addition to the independent second coil. In FIGS. 6 and 7, plan views at a media-facing surface show side shield arrangements according to example embodiments. An NFT 602 is located at one crosstrack edge 600a of a write pole 600. A side shield 604 is offset in the crosstrack direction from the NFT 602. The use of one side shield 604 can confine the magnetic structure to substantially one side with respect to the optical path, leaving the other side completely open. The peak effective (Stoner-Wolfarth) field in this case may be away from the leading edge 600a of the write pole 600, e.g., between the side shield 604 and the write pole 600. One way to compensate for this is shown in FIG. 7. As seen in FIG. 7, NFT 702 extends beyond a crosstrack edge 700a of a write pole 700. A tapered, off-centered side shield 704 is located across from the NFT in the crosstrack direction. This may provide a stronger field, although may involve added process complexity to obtain the illustrated shield shape.

Figure 8:
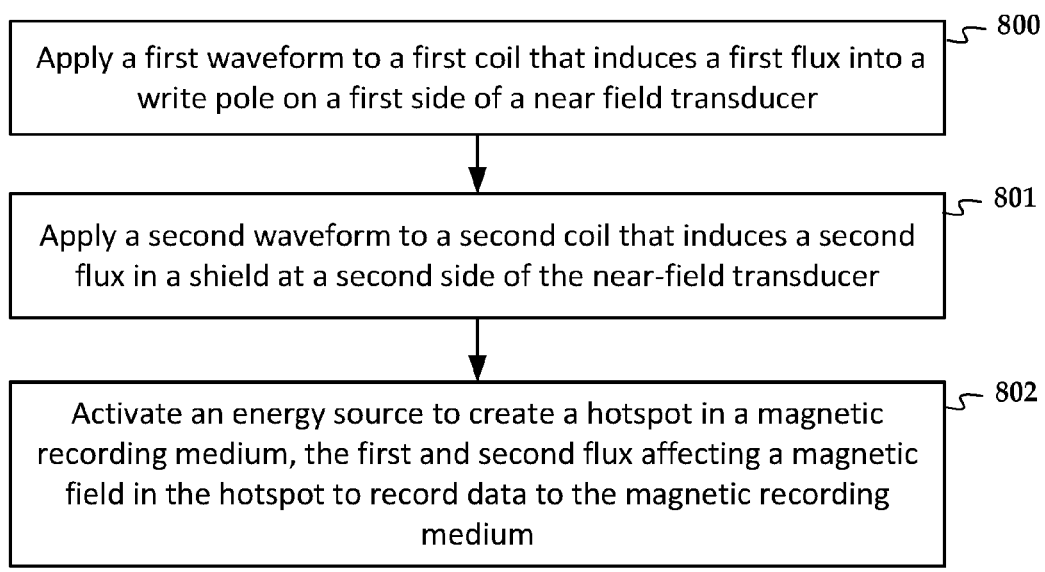
FIG. 8 is a flowchart of a method according to an example embodiment.
Figure 9:
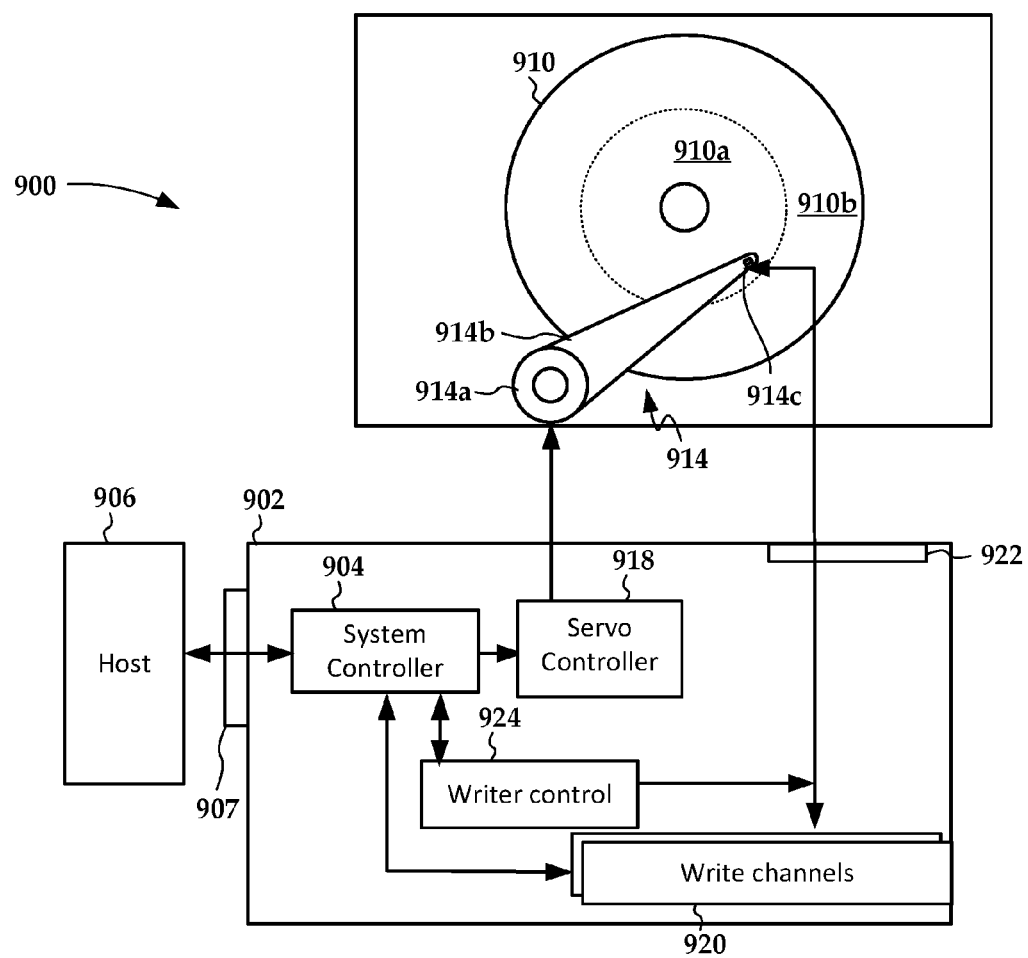
FIG. 9 is a block diagram of an apparatus according to an example embodiment.

In FIG. 8, a flowchart shows a method according to an example embodiment. The method involves applying 800 a first waveform to a first coil that induces a first flux into a write pole on a first side of a near field transducer. A second waveform is applied 801 to a second coil that induces a second flux in a shield. The shield is on a second side of the near-field transducer that faces away from the first side. The second flux controls a field angle of the first flux. An energy source is activated 802 to create a hotspot in a magnetic recording medium. The first and second flux affect a magnetic field in the hotspot to record data to the magnetic recording medium In FIG. 9, a block diagram illustrates an apparatus 900 according to an example embodiment. The apparatus 900 includes circuitry 902 that facilitates writing data to and reading data from a magnetic disk 910. The circuitry 902 includes a system controller 904 that oversees operations of the apparatus 900. The system controller 904 may include a generally purpose central processing unit, application specific integrated circuit, multi-function chipset, etc. Generally, the system controller 904 receives commands from a host 906 via a host interface 907. The host commands may include requests to load, store, and verify data that is targeted for the disk 910.

The apparatus 900 is shown with an actuator assembly 914 that includes a voice coil motor (VCM) 914a, arm 914b, and write head 914c. A servo controller 918 provides control signals to the VCM 914a using servo data obtained from a read element as feedback. The read element may be integrated with the write head 914c or within a head gimbal assembly to which the write head 914c is mounted.

The write head 914c includes a magnetic writer with first and second coils. The first coil induces a first flux in a write pole that is located on one side of a near-field transducer. The second coil is proximate a shield on a side of the near-field transducer that faces away from the write pole (in the downtrack direction). The shield may lead the write pole as the disk 910 moves underneath the write head 914c. The second coil induces a second flux in the shield that controls a field angle of the first flux.

One or more write channels 920 may be used to provide power to the writer coils during recording. The write channel 920 is coupled to the write head 914c via interface circuitry 912 such as preamplifiers, digital-to-analog converters, analog-to-digital converters, filters, etc. A write control module 924 manages aspects of operating the first and second coils independently. For example the write control module 924 may have one or more baseline configurations that define parameters of waveforms sent to the coils, e.g., as shown in FIG. 5. These parameters may change based on conditions of use, e.g., temperature, radial zone of the disk being recorded, age of the read/write head, etc.

The write control module 924 may also activate and deactivate an energy source (e.g., laser diode) integrated with the write head 914c. The activated energy source creates a hotspot on the disk 910 when recording. A first and second flux produced when activating the first and second coils affects a magnetic field in the hotspot. This change in magnetic field results in recording of data to the magnetic recording medium.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
    a near-field transducer at a media-facing surface of the recording head;
    a write pole on a first side of the near field transducer;
    a first coil inducing a first flux in the write pole;
    a shield on a second side of the near-field transducer that faces away from the first side; and
    a second coil proximate the shield, the second coil inducing a second flux in the shield that controls a field angle of the first flux.

2. The recording head of claim 1, wherein the shield comprises an L-shape with a first portion parallel to the media-facing surface and a second portion normal to the media-facing surface.

3. The recording head of claim 2, wherein the second coil is proximate the first portion of the shield, at least part of the second coil extending to an edge of the shield that faces the near-field transducer.

4. The recording head of claim 2, wherein the second coil is proximate a junction of the first portion of the shield with the second portion of the shield.

5. The recording head of claim 2, wherein at least the first portion of the shield has a reflective coating to minimize optical interference with the near-field transducer.

6. The recording head of claim 2, wherein the second coil is proximate the second portion of the shield and away from the media-facing surface.

7. The recording head of claim 1, wherein the shield comprises plate-like structure parallel with the media-facing surface, at least part of the second coil extending to an edge of the shield that faces the near-field transducer.

8. The recording head of claim 1, wherein the near-field transducer is at or overhangs a crosstrack edge of the write pole, the recording head further comprising a side shield proximate the crosstrack edge of the write pole.

9. A method comprising:
applying a first waveform to a first coil that induces a first flux into a write pole on a first side of a near field transducer;
applying a second waveform to a second coil that induces a second flux in a shield, the shield facing a second side of the near-field transducer that faces away from the first side, the second flux controlling a field angle of the first flux; and
activating an energy source to create a hotspot in a magnetic recording medium, the first and second flux affecting a magnetic field in the hotspot to record data to the magnetic recording medium.

10. The method of claim 9, wherein the first and second waveform are activated at different times.

11. The method of claim 10, wherein the first coil is activated before the second coil to create a field substantially perpendicular to the media-facing surface, the subsequent activation of the second coil causing an increase in magnetic field and field angle.

12. An apparatus, comprising:
a recording head comprising:
a near-field transducer at a media-facing surface of the recording head;
a write pole on a first side of the near field transducer
a first coil magnetically coupled to the write pole;
a shield on a second side of the near-field transducer that faces away from the first side; and
a second coil magnetically coupled to the shield;
interface circuitry coupled to the first and second coils; and
a controller coupled to the interface circuitry and configured to:
apply a first waveform to the first coil to induce a first flux into the write pole; and
apply a second waveform to the second coil that induces a second flux in the shield a second side of the near-field transducer that faces away from the first side, the second flux controlling a field angle of the first flux.

13. The apparatus of claim 12, wherein the shield comprises an L-shape with a first portion parallel to the media-facing surface and a second portion normal to the media-facing surface.

14. The apparatus of claim 13, wherein the second coil is proximate the first portion of the shield, at least part of the second coil extending to an edge of the shield that faces the near-field transducer.

15. The apparatus of claim 13, wherein the second coil is proximate a junction of the first portion of the shield with the second portion of the shield.

16. The apparatus of claim 13, wherein at least the first portion of the shield has a reflective coating to minimize optical interference with the near-field transducer.

17. The apparatus of claim 13, wherein the second coil is proximate the second portion of the shield and away from the media-facing surface.

18. The apparatus of claim 12, wherein the shield comprises plate-like structure parallel with the media-facing surface, at least part of the second coil extending to an edge of the shield that faces the near-field transducer.

19. The apparatus of claim 12, wherein the first coil is activated before the second coil to create a field substantially perpendicular to the media-facing surface, the subsequent activation of the second coil causing an increase in magnetic field and field angle.

20. The apparatus of claim 12, wherein the recording head further comprises an energy source, the controller further configured to activated the energy source to create a hotspot in a magnetic recording medium, the first and second flux affecting a magnetic field in the hotspot to record data to the magnetic recording medium.

* * * * *